Dec. 8, 1953  D. J. PARMESAN  2,661,965
UNION WHICH PERMITS MISALIGNMENT

Filed Oct. 7, 1948

INVENTOR.
Daniel J. Parmesan
BY
E. V. Hardway
ATTORNEY

Patented Dec. 8, 1953

2,661,965

UNITED STATES PATENT OFFICE 2,661,965

UNION WHICH PERMITS MISALIGNMENT

Daniel J. Parmesan, Houston, Tex., assignor, by mesne assignments, to Chiksan Company, Brea, Calif., a corporation of California Application October 7, 1948, Serial No. 53,286

1 Claim. (Cl. 285—122)

This invention relates to a union which permits misalignment.

An object of the invention is to provide a union of the character described whereby sections of pipe or tubing may be quickly connected or disconnected with a novel sealing arrangement between the coupling members to prevent leakage of fluid between said coupling members either as a result of pressure or suction.

Another object of the invention is to provide a union of the character described which includes not only a metal to metal seal between the coupling members but also a resilient seal ring embodied therein which very effectively seals the joint between the coupling members irrespective of the intensity of the pressure or suction.

The type of union herein described has been designed primarily as a pressure seal to prevent the escape of pressure fluid from the line connected by the union although it is also effective as a suction seal, that is it forms an effective seal even though the pressure within the line may be below outside pressure.

Other objects and advantages will be apparent from the following specification which is illustrated by the accompanying drawings, wherein.

Figure 1:
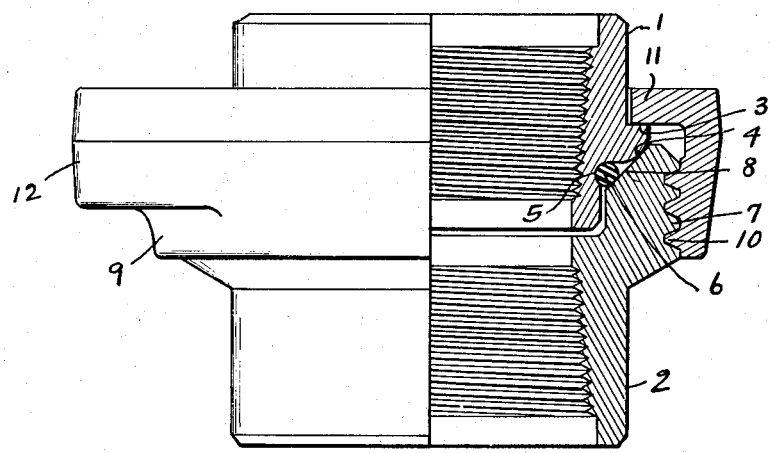
Figure 1 is a side view, partly in section, of a form of the union.

Referring now more particularly to the drawings wherein like numerals of reference designate the same parts in each of the figures, the numerals 1 and 2 designate, respectively, the coupling members of a union whose outer ends are internally threaded for the connection of sections of pipe thereto. The term "coupling member" as used herein is meant to embrace not only those illustrated but also such other members as blanking caps, reducing members, etc.

The inner end of the coupling member 1 is formed with an external annular shoulder 3 and beyond said shoulder, toward the inner end of the coupling member, said member has an external annular bearing surface 4 which is curved outwardly, that is toward the inner end of said member, all the way around.

The extreme inner end of the coupling member 1 is provided with a half round groove 5 all the way around to receive a resilient O-ring 6.

The abutting end of the coupling member 2 is outwardly thickened and formed with coarse external threads 7 and has an inside outwardly flared, plane annular face 8 against which the opposing bearing surface 4 fits closely so as to form a metal to metal joint when the coupling members are assembled.

The inner end of the coupling member 2 is internally enlarged and the inner end of the coupling member 1 telescopes into said enlarged end.

There is a clamp nut 9 having coarse internal threads 10 adapted to intermesh with the threads 7 and also having an internal annular flange 11 which fits closely over the section 1 and which is engageable with the shoulder 3, when the threads are screwed home, to clamp the facing ends of the coupling members in abutting relation.

The inside diameter of the threads 10 is somewhat larger than the outside diameter of the shoulder 3 so that the clamp nut 9 may be fitted over the coupling member 1 and the threads 10 screwed onto the threads 7.

The facing sides of the bearings surfaces 4 and 8 converge outwardly and the seal ring 6, in the groove 5, contacts with the face, or bearing surface 8, at all times but when said seal ring 6 is subjected to internal pressure it will be forced outwardly between said converging surfaces to form a very tight seal and, likewise, in case of low pressure in the line connected by the union the outside pressure will force the seal ring 6 inwardly to form a very tight seal.

The clamp nut 9 may have one, or more, radial lugs, as 12, to receive the impact of a hammer or similar instrument for screwing the clamp nut tightly home or for releasing it.

Figure 2:
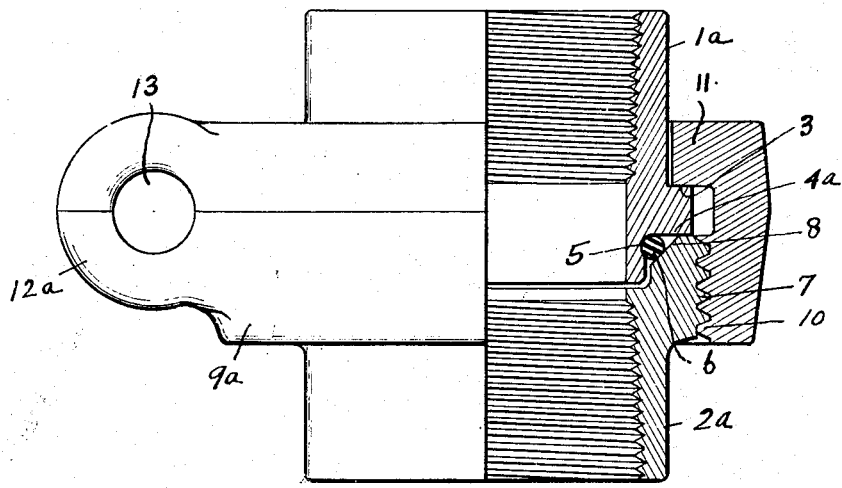
Figure 2 is a side elevation, partly in section, of another embodiment thereof.

Referring to the form of union disclosed in Figure 2 the coupling member 2a is substantially similar to the coupling member 2 but the coupling member 1a has a plane radial bearing surface 4a instead of the bearing surface 4 shown in Figure 1 and this plane radial bearing surface 4a bears directly against the opposing end of the coupling member 2a when the union is assembled, as illustrated in Figure 2.

In the form shown in Figure 2 the clamp nut 9a has one or more lugs 12a extending outwardly therefrom provided with openings, as 13, to receive an implement by means of which the clamp nut may be screwed home or unscrewed.

In other respects the form of union shown in Figure 2 is the same as that shown in Figure 1 and the parts have been correspondingly identified by similar numerals.

Normally the metal to metal seal will prevent the escape of pressure fluid whether the coupling members are axially aligned or misaligned, but in case they should not be in perfect contact the seal ring 6 will break the joint between them to prevent the escape of pressure fluid and said seal ring is so mounted between said coupling members that it may be distorted under the influence of fluid pressure to form a better seal irrespective of the degree of pressure inside or outside of the line.

It will be noted that the inner end of each coupling member 1, 1a is somewhat reduced in diameter and extended and fits into a corresponding recess in the other coupling member. This reduced extension facilitates the assembly of the coupling members and maintains them in proper alignment until the clamp nut is screwed into place.

What I claim is:

A union which comprises, in combination, a first coupling member having at one end an outwardly curved annular external face, a second coupling member having an inwardly flared substantially conical face so that said flared face contacts the curved face of said first member in an annular line contact to form a metal-to-metal seal therewith despite misalignment of the coupling members, said first member having an external annular groove inwardly adjacent said curved face with one side of said groove connecting tangentially with said curved face to form a smooth continuous wall therewith and having its other side extending away from the longitudinal axis of said first member to form an undercut portion for retaining a seal ring in said groove upon separation of the first and second members, said groove being disposed to face toward said flared face so that when said coupling members are joined together the flared face of said second coupling member and said wall converge from said groove to an apex situated at said metal-to-metal seal thereby forming an annular space which is V-shaped in cross-section, a resilient O-ring disposed in said groove with a portion of the periphery of the O-ring in contact with the wall of said groove and an opposite portion in contact with said flared face, said O-ring being uniformly circular in cross-section and of a cross-sectional diameter sufficiently large that with the coupling members joined together the O-ring is in sealing contact with said groove and said flared face with the latter urging the O-ring into its sealing contact with said groove, the O-ring bridging between said members across the base of said V-shaped space, and means for securing said coupling members together.

DANIEL J. PARMESAN.

References Cited in the file of this patent

UNITED STATES PATENTS

| Number | Name | Date |
|---|---|---|
| 571,762 | Hayes | Nov. 24, 1896 |
| 966,870 | Stoddard | Aug. 9, 1910 |
| 1,563,836 | Copp | Dec. 1, 1925 |
| 1,924,657 | Saine et al. | Aug. 29, 1933 |
| 2,208,353 | Woolley et al. | July 16, 1940 |
| 2,493,996 | Parmesan | Jan. 10, 1950 |
| 2,523,995 | Parmesan | Sept. 26, 1950 |

FOREIGN PATENTS

| Number | Country | Date |
|---|---|---|
| 204,900 | Great Britain | Oct. 11, 1923 |